Aug. 15, 1961  P. J. MAZZIOTTI ET AL  2,995,908
NEEDLE BEARING SPLINE

Filed Sept. 5, 1957  2 Sheets-Sheet 1

INVENTORS
PHILIP J. MAZZIOTTI
JOHN A. KAYSER
BY
*Lawrence C. Witker*
ATTORNEY

Aug. 15, 1961     P. J. MAZZIOTTI ET AL     2,995,908
NEEDLE BEARING SPLINE

Filed Sept. 5, 1957     2 Sheets-Sheet 2

*INVENTORS*
PHILIP J. MAZZIOTTI
JOHN A. KAYSER
BY

ATTORNEY

United States Patent Office 2,995,908
Patented Aug. 15, 1961

2,995,908
NEEDLE BEARING SPLINE
Philip J. Mazziotti and John A. Kayser, Toledo, Ohio, assignors to Dana Corporation, Toledo, Ohio, a corporation of Virginia
Filed Sept. 5, 1957, Ser. No. 682,125
6 Claims. (Cl. 64—23)

This invention relates to sliding splines in general and is more particularly directed to anti-friction bearing or rolling spline connections.

The primary object of this invention is to provide the cooperating splines between two longitudinally movable shafts with anti-friction means in the form of needle bearings which will permit such movement with reasonably small forces while transmitting torque loads.

The construction of the present invention is particularly desirable in propeller shaft applications where the shafts rotate at comparatively high speeds and must be capable of transmitting high torque loads while being varied in length. The use of needle bearings is desirable due to their high load carrying capacity; small size bearings being preferable so that many needles are interposed between the contact areas at one time.

Further objects and advantages will become apparent from a study of the following description when taken in connection with the accompanying drawings in which.

Figure 1:
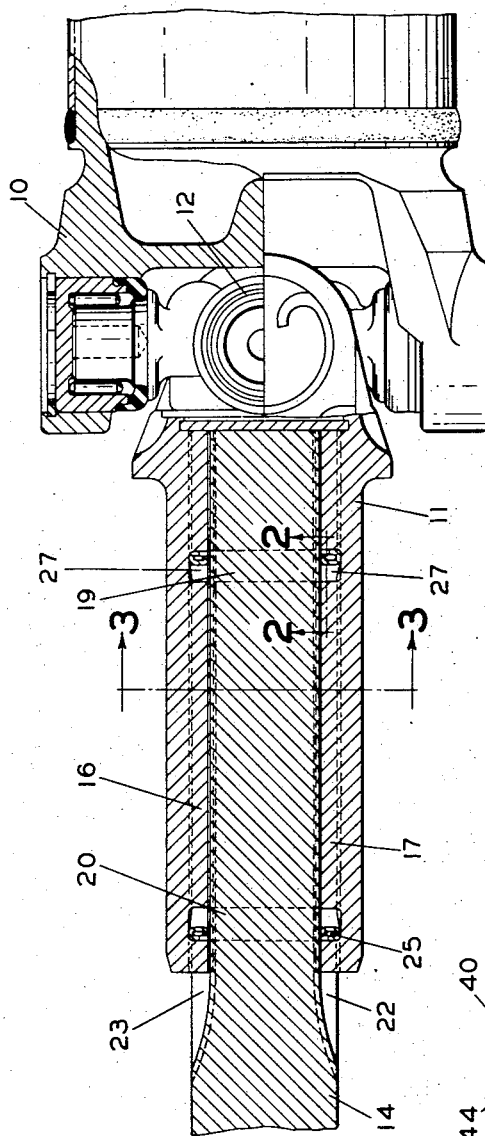
FIG. 1 is a longitudinal partial section of an automotive universal joint and propeller shaft assembly.

Referring first to FIG. 1, which illustrates a universal joint and propeller shaft assembly, the numeral 10 indicates a stub yoke to which is coupled a sleeve yoke 11 by means of a journal cross 12. The sleeve yoke is splined to receive a slip shaft 14, permitting relative axial displacement there-between during rotation of the assembly.

Figure 5:
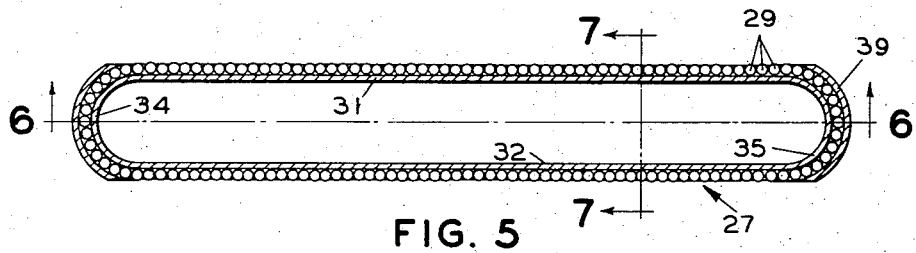
FIG. 5 is a longitudinal section of the bearing assembly.
Figure 6:
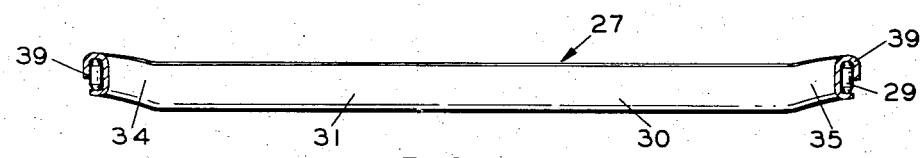
FIG. 6 is a sectional detail view taken on a line 6—6 of FIG. 5.
Figure 7:
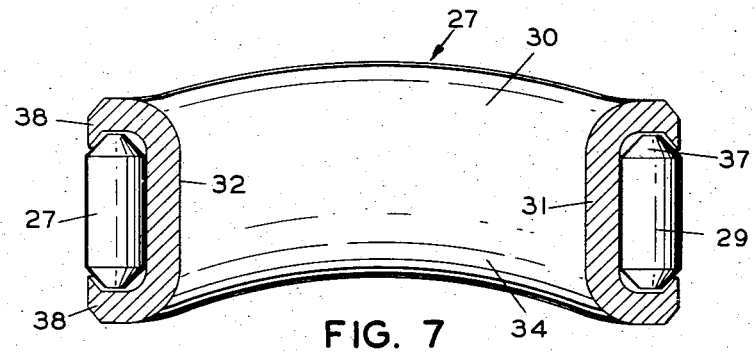
FIG. 7 is an enlarged sectional detail taken on a line 7—7 of FIG. 5.

The sleeve yoke 11 is internally broached to provide the inner surface 15 thereof with elongated splines 16 and 17. A pair of longitudinally spaced annular recesses 19 and 20 define the ends of the splines and are provided so that the bearing assemblies of the present invention may be assembled on the splines. The slip shaft is provided with spline receiving recesses or grooves 22 and 23 to accommodate with side clearance the splines 16 and 17, the bottom face 24 of the grooves being arcuate to slidably engage the top face 25 of the splines 16 and 17. The width of the splines 16 and 17 is controlled so as to accommodate with a reasonably tight fit the bearing assembly 27 illustrated in FIGS. 5, 6 and 7. The width of the grooves 22 and 23 is also controlled so that reasonably close backlash limits can be maintained between the needles 29 of the assemblies 27 and the side walls of the grooves 22 and 23, for the transmission of torque loads.

Figure 2:
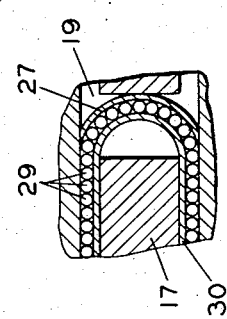
FIG. 2 is a sectional detail view taken substantially on a line 2—2 of FIG. 1.
Figure 3:
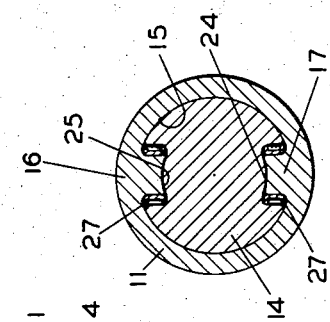
FIG. 3 is a transverse section taken on a line 3—3 of FIG. 1.

The bearing assembly 27 consists of the needles 29 and a cage or retainer 30 having spaced parallel inner side walls 31 and 32 and arcuate end portions 34 and 35. For the most part the retainer 30 is of generally C cross-section and the needles have conical ends 37 to conform to the shape of the lips 38 of the main body portion of the retainer 30. The end portions 34 and 35 are provided with depending upper lip portions 39 only, to guide the rollers 29 as they negotiate the curves at the ends of the splines 16 and 17. As shown in FIG. 2, an arcuate channel is thus provided for the needles in the area of the recesses 19, which channel is also vertically displaced to conform to the shape of the face 24 of the bottom of grooves 22 and 23. The bearing assemblies 27 are assembled onto the splines 16 and 17 prior to telescopically assembling the slip shaft 14 in the sleeve yoke 11, as will be understood. The needles 29 thus engage the side walls of the grooves 22 and 23, and during axial displacement between the sleeve yoke 11 and the slip shaft 14 the needles are fully recirculating in either direction while transmitting torque loads.

Figure 4:
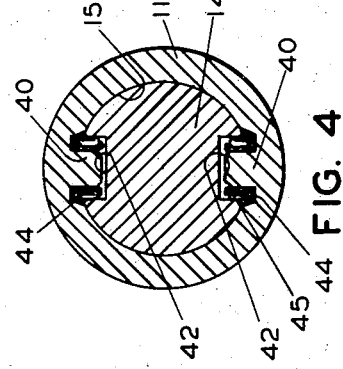
FIG. 4 is a transverse section similar to FIG. 3 but showing a modified form of bearing assembly.
Figure 8:
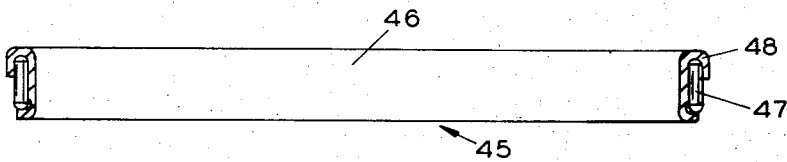
FIG. 8 is a sectional detail view similar to FIG. 6 illustrating the modified bearing assembly of FIG. 4.

A modified form of retainer is shown in FIGS. 4 and 8, which may be used in slip joints having spline connections that have flat rather than arcuate top and bottom walls as in the previously described form of the invention. As shown in FIG. 4, clearance is provided on three sides of the splines 40 and cooperating grooves 42, the inner surface 15 of sleeve yoke 11 being additionally relieved on both sides of the splines 40 as at 44 to provide longitudinal recesses for the reception of the bearing assemblies 45, consisting of a retainer 46 and a series of needles or rollers 47. This arrangement permits the use of rounded end rollers or needles 47 which are less expensive and the retainer 46 may be substantially flat at the end portions rather than having vertically displaced portions as at 34 and 35 in FIG. 6. The retainer 46 is provided with a depending lip portion 48 which extends downwardly an amount sufficient to hold the needles 47 in the race when assembled therewith.

In both forms of the invention, the bearing assemblies are capable of carrying torque loads in either direction. The needles carry only torque load and are free to rotate when there is axial movement between the sliding parts. While only two diametrically opposed splines have been shown in the foregoing forms of the invention, it will be understood that any desired number of splines can be used, with an equivalent number of bearing assemblies, depending upon the amount of torque required to be transmitted.

By means of the illustrated constructions the friction ordinarily present in slip joints has been materially reduced, and as a consequence high torque loads may be transmitted during axial displacement of the relatively movable parts without backlash and the accompanying noise.

What is claimed:

1. A slip joint between a pair of relatively slidable shafts rotatable as a unit, the combination comprising, and outer sleeve have a plurality of raised splines on its inner surface, an inner shaft having a plurality of grooves on its outer surface for receiving said splines, a self-contained bearing unit on each of said splines for cooperation with each of said grooves, said bearing unit including a plurality of needle bearings, an elongated annulus, substantially C-shaped in cross-section, for containing the said needle bearings and having a press fit on the side walls of each of said splines, said elongated annulus further defining a closed circuit for the circulation of the needle bearings incidental to slipping of the joint, whereby the shafts can move axially relative to each other with reasonably small forces while transmitting large torque loads at comparatively high speeds.

2. A slip joint comprising, a plurality of bearing units, an outer sleeve yoke having a plurality of raised splines on its inner surface, an inner shaft having a plurality of grooves on its outer surface substantially opposite said splines, said shaft being slidable axially in relation to said sleeve and on said bearing units, said sleeve and shaft rotating as a unit in either direction, said bearing units including a retainer having a press fit on the side walls of each of said splines, and a plurality of needle bearings in engagement with the side walls of said grooves, said needle bearings further being contained in a closed circuit in a spaced relationship to each other by said retainer, whereby the needle bearings will rotate about their own axis and will recirculate in either axial direction as the shaft and sleeve slide axially relative to each other under torque load.

3. A slip joint between a pair of relatively slidable shafts rotatable as a unit, inner and outer cooperating splines on said shafts, a plurality of needle bearing units between said inner and outer splines, each said bearing unit consisting of a series of needle rollers, and a retainer for each of said series of needle rollers having a press fit on the opposite walls of said inner splines, said retainer further defining a closed path for the full recirculation of the needle rollers in either axial direction incidental to relative slip between the slidable shafts.

4. The combination with a pair of relatively slidable shafts rotatable as a unit of a pair of inner and outer cooperating splines on said shafts, said splines having longitudinally extending spaces between their sidewalls, a plurality of needle bearings arranged in said spaces, and longitudinally extending retaining means forming a closed circuit for said needle bearings fixed in said spaces on one of said shafts, whereby said needle bearings permit said shafts to slip relative to each other while transmitting large torque loads at high speeds and said retainer serves to permit installation and removal of said needle bearings as a unit.

5. A slip joint for a pair of relatively slidable shafts rotatable as a unit comprising inner and outer cooperating splines on the shafts, said splines having longitudinally extending spaces between their side walls, a plurality of bearings arranged in said spaces, and longitudinally extending retaining means forming a closed circuit for said bearings and fixed in said spaces on one of said shafts, whereby said bearings permit said shafts to slip relative to each other while transmitting large torque loads at high speeds and said retainer serves to permit installation and removal of said bearings as a unit.

6. A slip joint comprising a pair of relatively slidable shafts rotatable as a unit, one of said shafts having a longitudinally extending projection, the other of said shafts having a longitudinally extending recess for cooperation with said projection, the side walls of said recess and said projection defining longitudinally extending spaces, a plurality of bearings arranged in said spaces, and longitudinally extending retaining means forming a closed circuit for said bearings and being fixed in said spaces on said one shaft.

References Cited in the file of this patent

UNITED STATES PATENTS

| | | |
|---|---|---|
| 2,532,754 | Beck | Dec. 5, 1950 |
| 2,791,894 | Duckworth | May 14, 1957 |

FOREIGN PATENTS

| | | |
|---|---|---|
| 975,115 | France | Oct. 11, 1950 |
| 1,125,204 | France | July 9, 1956 |